(12) United States Patent
Farooq et al.

(10) Patent No.: US 9,481,276 B2
(45) Date of Patent: Nov. 1, 2016

(54) OPERABLE ARMREST ASSEMBLY FOR VEHICLE DOOR AND CENTER CONSOLE

(71) Applicant: Ford Global Technologies, LLC, Dearborn, MI (US)

(72) Inventors: Iskander Farooq, Novi, MI (US); Mohammed Omar Faruque, Ann Arbor, MI (US); Scott H. Dunham, Redford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 345 days.

(21) Appl. No.: 14/331,529

(22) Filed: Jul. 15, 2014

(65) Prior Publication Data

US 2016/0016494 A1   Jan. 21, 2016

(51) Int. Cl.
*B60N 2/46* (2006.01)

(52) U.S. Cl.
CPC ............. *B60N 2/466* (2013.01); *B60N 2/4633* (2013.01)

(58) Field of Classification Search
CPC ............................. B60N 2/466; B60N 2/4633
USPC ..................................................... 296/24.34
IPC ........................................................ B60N 2/46
See application file for complete search history.

(56) References Cited

U.S. PATENT DOCUMENTS

| | | | |
|---|---|---|---|
| 4,598,948 A * | 7/1986 | Flowerday | B60N 2/4606 297/411.35 |
| 4,674,790 A | 6/1987 | Johnson | |
| 5,845,965 A | 12/1998 | Heath et al. | |
| 5,997,092 A | 12/1999 | Slaven | |
| 6,003,927 A | 12/1999 | Korber et al. | |
| 6,905,163 B2 | 6/2005 | Bornchen et al. | |
| 6,932,402 B2 * | 8/2005 | Niwa | B60N 2/4646 296/1.09 |
| 7,168,750 B2 * | 1/2007 | Hutek | B60N 2/464 296/24.34 |
| 7,484,809 B2 | 2/2009 | Hughes | |
| 7,537,268 B2 | 5/2009 | Becker et al. | |
| 8,167,348 B2 * | 5/2012 | Fesenmyer | B60N 2/4606 296/1.09 |
| 9,156,386 B2 * | 10/2015 | Cinco | B60N 2/4646 |
| 2004/0164577 A1 | 8/2004 | Shabana et al. | |
| 2004/0251746 A1 * | 12/2004 | Ichimaru | B60N 3/102 307/116 |
| 2009/0079228 A1 | 3/2009 | Sturt et al. | |

FOREIGN PATENT DOCUMENTS

| | | |
|---|---|---|
| EP | 1676743 A1 | 7/2006 |
| EP | 1676744 A1 | 7/2006 |
| WO | 2014012021 A1 | 1/2014 |

\* cited by examiner

*Primary Examiner* — Pinel Romain
(74) *Attorney, Agent, or Firm* — Vichut Chea; Price Heneveld LLP

(57) ABSTRACT

A vehicle armrest assembly for a door and console includes a linear actuator extending vertically through at least a portion of an armrest substrate and having a pin at an upper end, a support plate positioned above the armrest substrate and having a slot, wherein the pin slidably engages the slot to allow the support plate to operate laterally along the slot and rotationally about the pin between a plurality of lateral and rotational positions, respectively. The linear actuator vertically operates the support plate between a plurality of vertical positions and a cover member is disposed over the support plate.

20 Claims, 7 Drawing Sheets

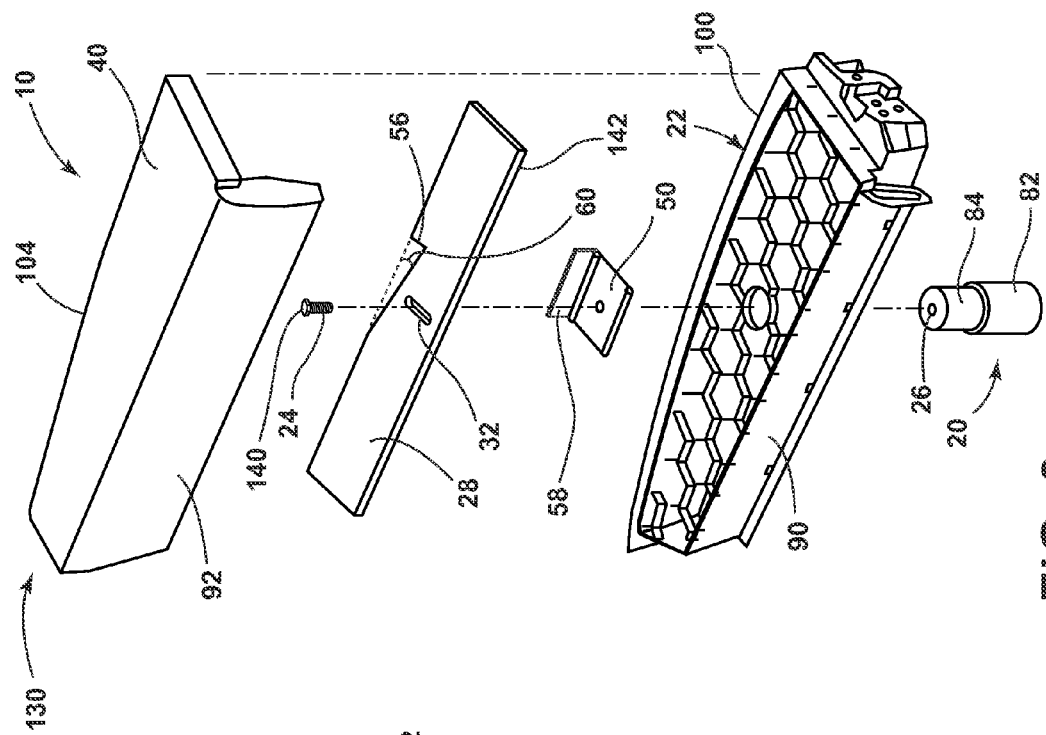
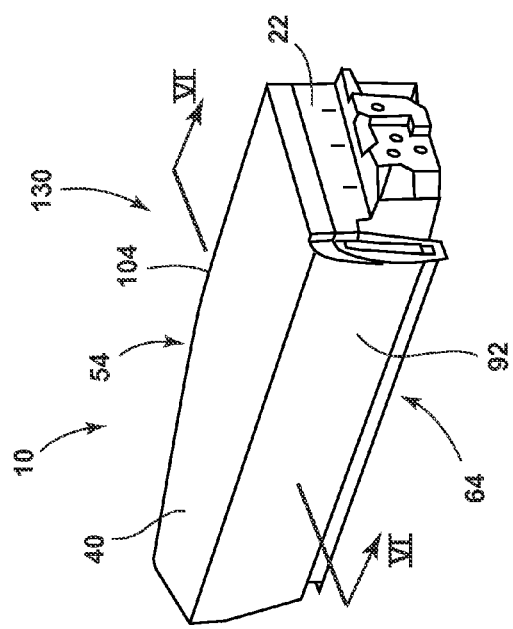

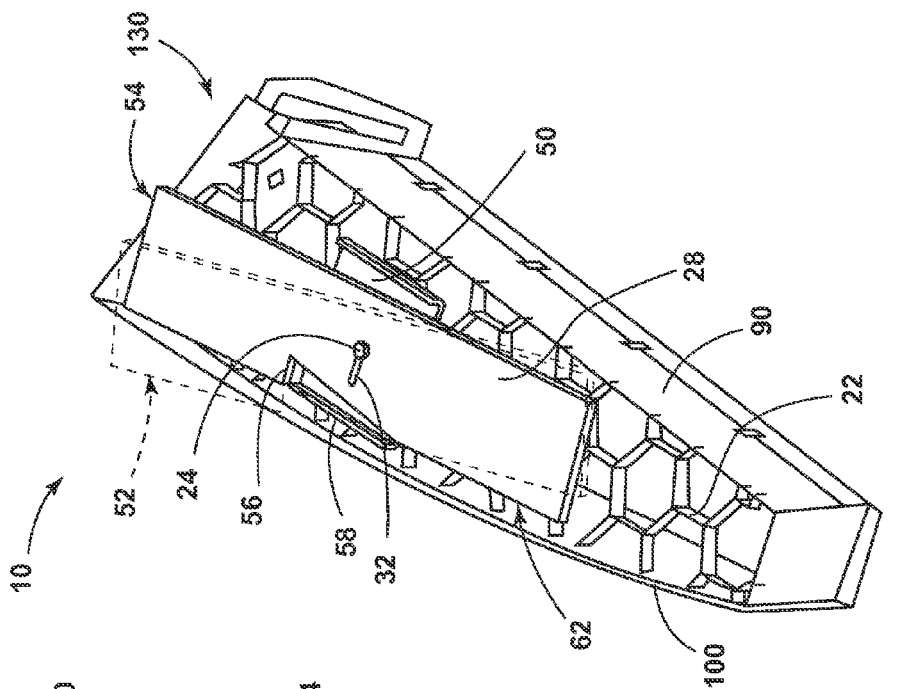
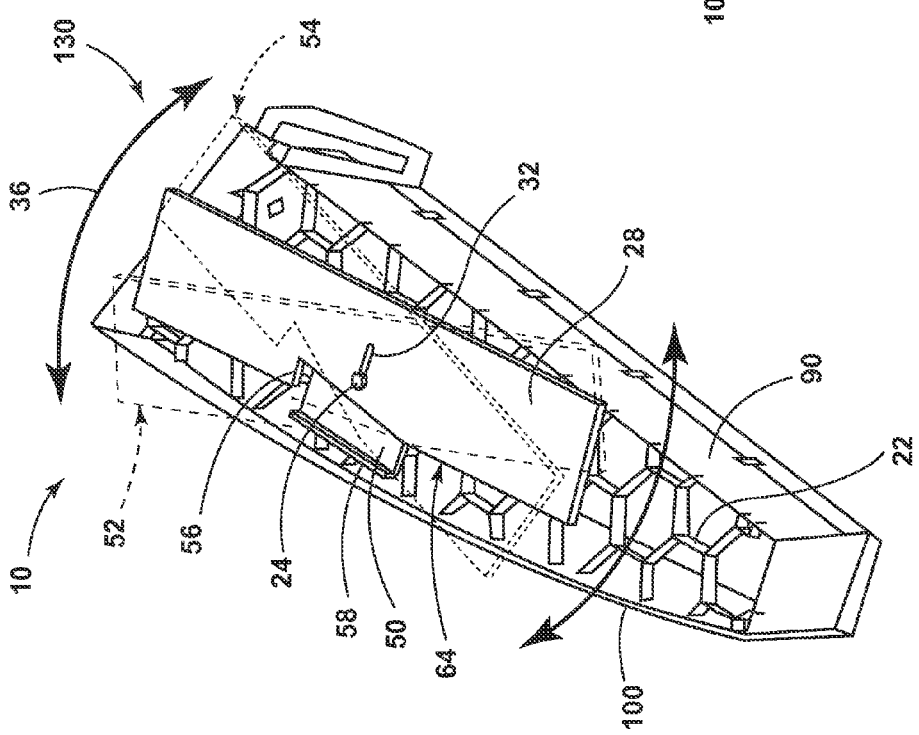

OPERABLE ARMREST ASSEMBLY FOR VEHICLE DOOR AND CENTER CONSOLE

FIELD OF THE INVENTION

The present invention generally relates to vehicle armrests, and more specifically, operable vehicle armrests that can be disposed within vehicle doors and center consoles.

BACKGROUND OF THE INVENTION

In providing comfort for occupants of vehicles, many vehicles are designed with door armrests and center consoles that incorporate armrests. Generally, these armrests are placed in a fixed position relative to the vehicle seat. Limited unidirectional movement is provided in some vehicle designs.

SUMMARY OF THE INVENTION

According to one aspect of the present invention, a vehicle armrest assembly for a door and console includes a linear actuator extending vertically from at least a portion of an armrest substrate and having a pin at an upper end, a support plate positioned above the armrest substrate and having a slot, wherein the pin slidably engages the slot to allow the support plate to operate laterally along the slot and rotationally about the pin between a plurality of lateral and rotational positions, respectively. The linear actuator vertically operates the support plate between a plurality of vertical positions. A cover member is disposed over the support plate.

According to another aspect of the present invention, a vehicle armrest includes a support plate and a linear actuator having a pin that engages a slot of the support plate. The support plate is operable relative to the pin between a plurality of lateral and rotational positions and the linear actuator operates the support plate between a plurality of vertical positions. A cover member extends at least partially over the support plate.

According to another aspect of the present invention, a vehicle armrest assembly includes a plurality of support plates, each having an internal slot and a vertical actuating assembly adapted to independently operate each of the plurality of support plates between a plurality of vertical positions. Each internal slot receives a corresponding pin of the vertical actuating assembly, and each of the plurality of support plates independently operates between a plurality of lateral and rotational positions relative to each corresponding pin.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 2 is an enlarged perspective view of another embodiment of the operable armrest assembly, with the cushion of the armrest in a retracted position;

FIG. 3 is an exploded perspective view of the operable armrest assembly of FIG. 2;

FIG. 4 is a top perspective view of the operable armrest assembly of FIG. 2 with the cover member removed and the support plate in an inward position;

FIG. 5 is a top perspective view of the operable armrest assembly of FIG. 4 with the support plate in an outward position;

DETAILED DESCRIPTION OF THE PREFERRED EMBODIMENTS

Figure 1:
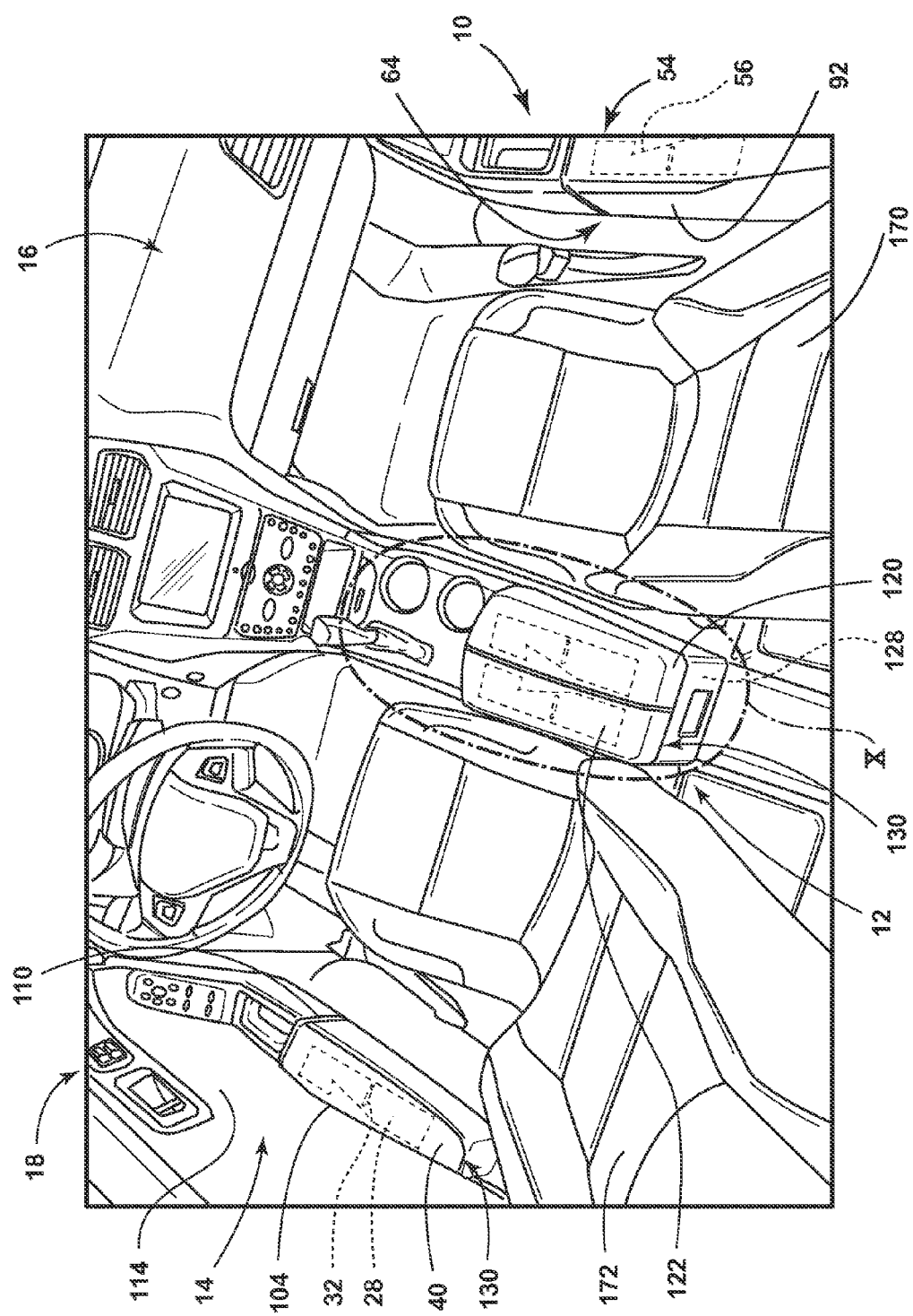
FIG. 1 is a top perspective view of a front portion of a vehicle cabin incorporating one embodiment of the operable armrest assembly.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in FIGS. 1-8, reference numeral 10 generally refers to an operable armrest assembly shown installed within the center console 12 and door 14 of the passenger cabin 16 of a vehicle 18, according to one embodiment. The operable armrest assembly 10 includes a linear actuator 20 that extends vertically from at least a portion of an armrest substrate 22, where the linear actuator 20 includes a pin 24 at an upper end 26. A support plate 28 is positioned above the armrest substrate 22 and includes a slot 32, wherein the pin 24 slidably engages the slot 32 to allow the support plate 28 to operate laterally along the slot 32 and rotationally about the pin 24 between a plurality of lateral and rotational positions 34, 36, respectively. The linear actuator 20 is adapted to vertically operate the support plate 28 between a plurality of vertical positions 38. A cover member 40 is disposed over the support plate 28 and at least partially provides cushioning for the arm or other body part of an occupant of the vehicle 18.

In the various embodiments, as illustrated in FIGS. 1-8, a pivot plate 50 is disposed proximate the support plate 28. The pivot plate 50 is adapted to define at least a first rotated position 52 and a second rotated position 54 of the plurality of rotational positions 36, where the first rotated position 52 is different than the second rotated position 54. It is contemplated that the support plate 28 can include a cutout portion 56 that is adapted to engage a flange 58 of the pivot plate 50 that further defines at least the first rotated position 52. In order for the support plate 28 to rotate when the support plate 28 is in an inward position 62, the support plate 28 is adapted to include the cutout portion 56 that engages the flange 58 of the pivot plate 50 in order to further define at least the first rotated position 52. It is further contemplated that the cutout portion 56 of the support plate 28 is disposed at a predetermined angle 60 relative to the flange 58 of the pivot plate 50 to allow a predetermined amount of rotation for the support plate 28 to pivot around the pin 24 in the upper end 26 of the linear actuator 20. The predetermined angle 60, typically, can be the same angle that defines the first rotated position 52. In this manner, when the support plate 28 is in the first rotated position 52, the cutout portion 56 can be substantially parallel with the flange 58 of the pivot plate 50.

As further illustrated in FIGS. 1-8, in various embodiments, at least a portion of the cutout portion 56 of the support plate 28 is positioned proximate the slot 32 of the support plate 28. In this manner, because of the space provided by the cutout portion 56, the support plate 28 is allowed to rotate about the pin 24 disposed in the upper end 26 of the linear actuator 20 to define the plurality of rotational positions 36. Also, because of the cutout portion 56, the support plate 28 is allowed to rotate between the first and second rotated positions 52, 54 while in either the inward position 62 or outward position 64, or any of the plurality of lateral positions 34 therebetween. It should be understood that in the various embodiments described herein, the designation of the inward and outward positions 62, 64 of the support plate 28 are relative to the center of the vehicle seat adjacent to the operable armrest assembly 10. As such, "outward" denotes outward and away from an occupant and "inward" denotes inward and toward an occupant.

Referring again to FIGS. 1-8, the linear actuator 20 of the operable armrest assembly 10 can be attached to a portion of the armrest substrate 22 or the door structure 80 in order to provide vertical support for the actuator 20 as it operates the support plate 28 between the plurality of vertical positions 38. The linear actuator 20 can be a piston-type actuator 20 that includes an actuator base 82 and an actuator piston 84 that operates within the actuator base 82. Alternatively, the support plate 28 for the operable armrest assembly 10 can be moved between the plurality of vertical positions 38 by different types of actuators 20 that can include, but are not limited to, screw-type actuators, scissor-type actuators, rack-and-pinion actuators, gearing assemblies, and others. The actuator 20 implemented within the operable armrest assembly 10 can be adapted such that the upper end 26 of the actuator 20 is adapted to receive the pin 24 that extends through the slot 32 of the support plate 28. In this manner, the engagement of the pin 24 within the upper end 26 of the actuator 20 and the slot 32 of the support plate 28 can simultaneously provide the vertical, lateral and twisting movement of the operable armrest assembly 10. In various embodiments, the actuator 20 can extend through a portion of the armrest substrate 22 such that the actuator 20 can centrally support the support plate 28 over the armrest substrate 22. In various alternate embodiments, the actuator 20 can rest upon a portion of the armrest substrate 22.

Referring again to FIGS. 4-8, the slot 32 of the support plate 28 is configured to extend at least partially through the support plate 28 such that the pin 24 of the actuator 20 can be confined within an interior portion of the support plate 28. The pin 24 of the actuator 20 is adapted to slidably engage the slot 32 of the support plate 28. In this manner, as the pin 24 slides laterally through the slot 32 of the support plate 28, the support plate 28 can move to define the plurality of lateral positions 34, including the outward and inward positions 64, 62. At the same time, the pin 24 is also rotationally engaged within the slot 32 such that the support plate 28 can rotate about the pin 24 in order to define the plurality of rotational positions 36 of the cover member 40 and support plate 28, including the first and second rotated positions 52, 54 that correspond to clockwise and counter-clockwise rotational positions, respectively.

Referring again to FIGS. 7 and 8, in order to accommodate the rotational movement of the support plate 28 and the cover member 40 when the support plate 28 is in the outward position 64, an inner wall 90 of the armrest substrate 22 is positioned offset from a vertical wall 92 of the cover member 40. In this manner, as the support plate 28 rotates between the first and second rotated positions 52, 54, the vertical wall 92 of the cover member 40, being spaced apart from the inner wall 90 of the armrest substrate 22, is afforded space within which the cover member 40 can rotate with the support plate 28.

Figure 7:
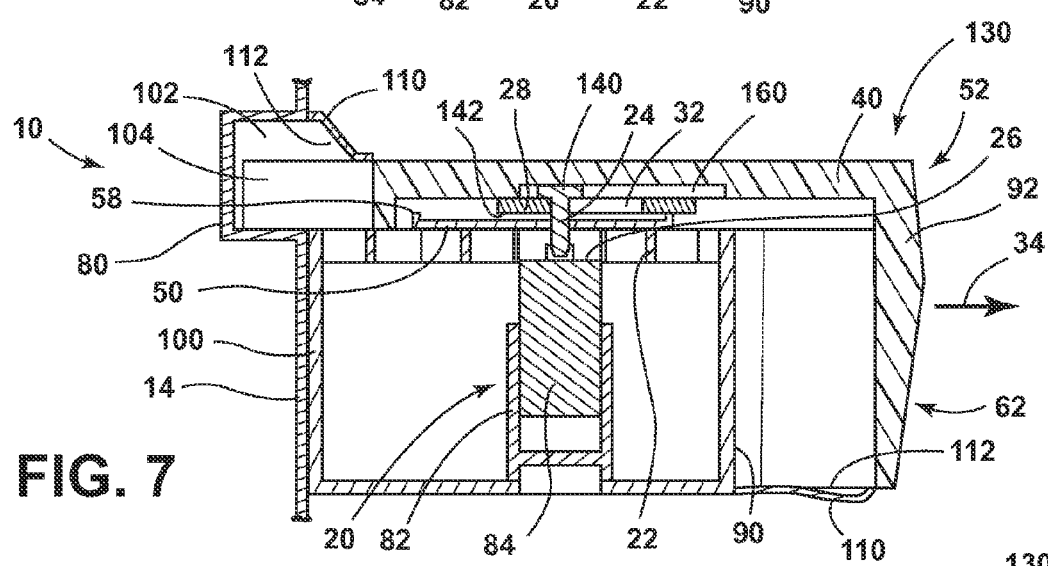
FIG. 7 is a cross-sectional view of an alternate embodiment of the operable armrest assembly with the cover member and support plate in an inward and rotated position.
Figure 8:
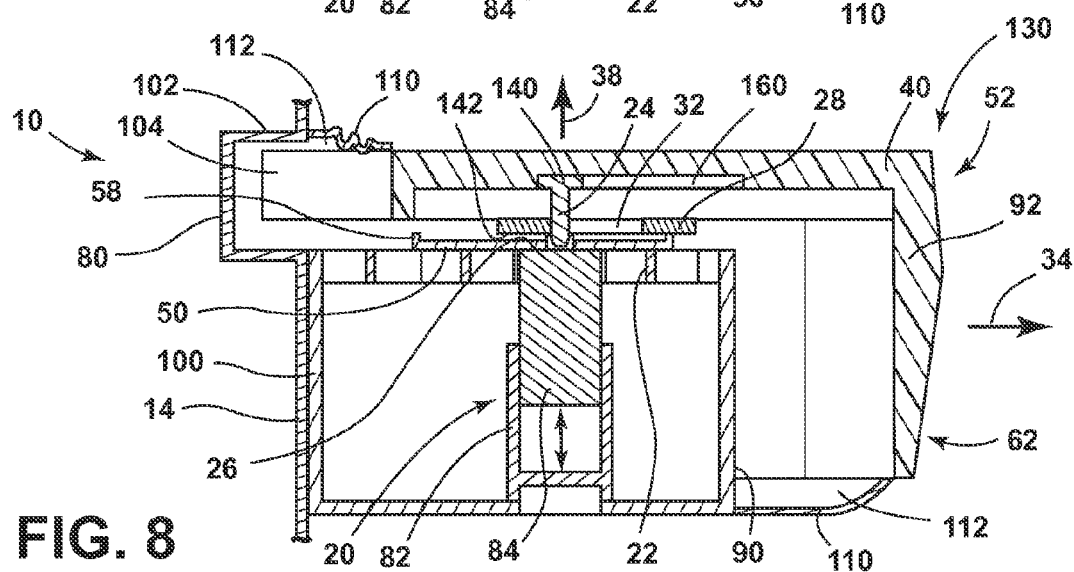
FIG. 8 is a cross-sectional view of the operable armrest assembly of FIG. 7 with the cover member and support plate in an inward, raised and rotated position.

As further illustrated in FIGS. 7 and 8, in various embodiments, an outer wall 100 of the armrest substrate 22 can include a recessed portion 102 that is adapted to receive a portion of the cover member 40 as the cover member 40 rotates between a plurality of rotational positions 36. Put another way, when the support plate 28 is in the outward position 64, at least a portion of the distal side 104 of the cover member 40 can be positioned proximate a portion of the vehicle door 14, in the case of an armrest 130 of the door 14 of a vehicle 18. In this configuration, as the support plate 28 rotates between the plurality of rotational positions 36, the distal portion of the cover member 40 as well as portions of the support plate 28 rotate toward the door 14. As such, the recessed portion 102 of the outer wall 100 of the armrest substrate 22 is adapted to receive portions of the distal side 104 of the cover member 40 and the support plate 28 in order to allow for this rotational movement of the operable armrest assembly 10. In this manner, the recessed portion 102 provides clearance for the cover member 40 to rotate about the pin 24 between the first and second rotated positions 52, 54. The recessed portion 102 can also provide a boundary for the distal side 104 of the cover member 40 that can serve to at least partially define the first and second rotated positions 52, 54.

Referring again to FIGS. 7 and 8, the operable armrest assembly 10 can include one or more flexible transition members 110 that extend between the cover member 40 of the operable armrest assembly 10 to an adjacent portion of the passenger cabin 16 of the vehicle 18. In this manner, flexible transition members 110 are adapted to fill gaps 112 that may appear between the cover member 40 and a portion of the vehicle 18 when the cover member 40 is moved toward the inward position 62, away from the side of the vehicle door 14 or center console 12. As the cover member 40 is moved away from the vehicle door 14 or center console 12 and toward the inward position 62, the flexible transition member 110 extends to fill the gap 112 between the cover member 40 and the side of the vehicle door 14 or console. Conversely, when the cover member 40 moves towards the vehicle structure, the flexible transition member 110 can fold, flex, bend, or otherwise deform in order to conceal any gaps 112 that may exist while also conforming to the movement of the operable armrest assembly 10.

Referring again to FIGS. 7 and 8, the flexible transition members 110 of the operable armrest assembly 10 can extend from the cover member 40 to at least a portion of an internal panel 114 of a vehicle 18. The positioning of the operable armrest assembly 10 within the passenger cabin 16 can determine which internal panel 114 of the vehicle 18 that the flexible transition member 110 extends to. Such internal panels 114 can include at least one of the armrest substrate 22, the internal panel 114 of door 14, the center console 12, or other internal panel 114 of the passenger cabin 16.

Figure 10:
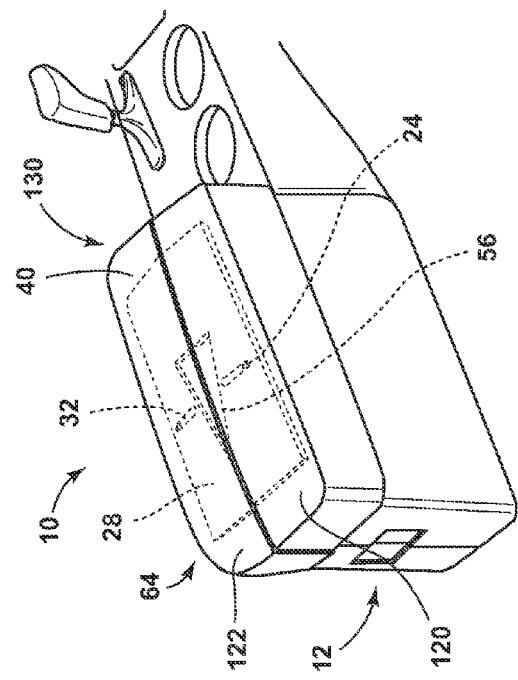
FIG. 10 is a top perspective view of the center console of FIG. 1 taken at area X, incorporating an embodiment of the operable armrest assembly and with the left and right center console armrests disposed in the retracted position.
Figure 11:
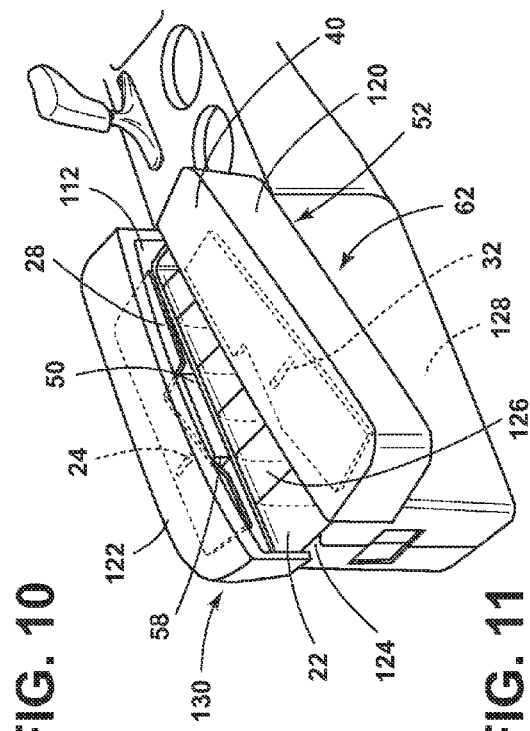
FIG. 11 is a top perspective view of the center console of FIG. 10 with the left-side console armrest in the raised position and the right-side center console armrest in the outward and rotated position.

Referring now to FIGS. 10 and 11, in the various embodiments, the operable armrest assembly 10 can also be disposed within the center console 12 of the vehicle 18. According to various embodiments, the center console 12 can include a single armrest 130 or can include right and left console armrests 120, 122 that are independently operable from one another. In such an embodiment, each of the right and left console armrests 120, 122 includes a dedicated support plate 28 with an internal slot 32 disposed therein and dedicated actuators 20 that engage each respective support plate 28. Each actuator 20 can also include a pin 24 that slidably engages each respective slot 32 of the dedicated support plates 28. Each of the right and left console armrests 120, 122 can also include a dedicated pivot plate 50, wherein each pivot plate 50, support plate 28, slot 32 and actuator 20 operates to define the various vertical, lateral and rotational positions 38, 34, 36 of each of the right and left console armrests 120, 122 of the operable armrest assembly 10.

Referring again to FIGS. 10 and 11, the right and left console armrests 120, 122 can define a top portion 124 of the center console 12 that is configured to position the right and left console armrests 120, 122. Below the right and left console armrests 120, 122 can be disposed a console bin cover 126 for a console bin 128 disposed within the center console 12. In this manner, as the right and left console armrests 120, 122 move between the inward and outward positions 62, 64, the console bin 128 can remain concealed via the separate console bin cover 126. It is further contemplated that the right and left console armrests 120, 122 can rest upon and be supported by the console bin cover 126. In this manner, when the console bin cover 126 is lifted, the right and left console armrests 120, 122 are lifted with the console bin cover 126 to provide access to the console bin 128. Additionally, in this embodiment, the console bin cover 126 can provide at least a portion of the substrate 22 upon which the operable armrest assembly 10 for the center console 12 can be supported. In various alternate embodiments, the console bin 128 can be accessed by separating the right and left console armrests 120, 122, wherein the gap 112 between the right and left console armrests 120, 122 provides the opening through which the console bin 128 can be accessed.

Referring again to FIGS. 1-11, it is contemplated that the operable armrest assembly 10 disposed within the door 14 and within the center console 12 can be configured to be selectively joined for unitary operation. In such an embodiment, the operable armrest assembly 10 within the door 14 and center console 12 can be linked such that when one armrest 130 is raised, moved laterally or rotated, both are raised by a vertical actuating assembly including one or more actuators 20. The vertical actuating assembly can be configured to simultaneously or independently operate the armrests. Typically, such an embodiment would be implemented within passenger seating for the vehicle 18 where access to the steering wheel, instruments and control mechanisms of the vehicle 18 is less critical. For the driver's seat 172, the linkage between the armrests 130 of the operable armrest assembly 10 within the door 14 and center console 12 may be selective such that a driver who prefers one arm higher than another can selectively move one of the armrests 130 higher, or to another lateral or rotational position than the other armrest 130 to provide the desired comfort positioning for operation of the vehicle 18. In this situation, the linking of the two armrests 130 of the operable armrest assembly 10 can be selected such that a control can be implemented for selecting unitary movement of the two armrests 130 or independent movement thereof, based upon the needs of the driver of the vehicle 18. It is further contemplated that the selective unitary and independent operation of the armrests 130 of the operable armrest assembly 10 within the door 14 and center console 12 can be provided to other occupants of the vehicle 18 as well.

By way of explanation, and not limitation, a vehicle 18 can have side-by-side first and second seating positions. In this embodiment, the first seating position can include door 14 and center console 12 armrests 130 having respective first door and first console support plates 28. The first door and first console support plates 28 can be simultaneously or independently operated by a first vertical actuating assembly. Similarly, the second seating position can have a second door 14 and center console 12 armrests 130 having respective second door and second console support plates 28 that are operated by a second vertical actuating assembly. Each of the first and second seating positions includes dedicated controls for adjusting each of the respective door 14 and center console 12 armrests 130 between the plurality of lateral, rotational and vertical positions 34, 36, 38. Additionally, each of the support plates 28 is adapted to be slidably engaged by a corresponding pin 24 disposed at an upper end 26 of the actuators 20 of the vertical actuating assemblies. In this example embodiment, the engagement of the pins 24, the support plates 28 and the cover member 40 can be substantially similar to the engagement described in the various embodiments discussed above.

In the various embodiments, the support plate 28 for the operable armrest assembly 10 can include various rigid and sturdy materials that can include, but are not limited to, steel, metals, metal alloys, plastic, composite, combinations thereof, as well as other substantially rigid materials. It is also contemplated that the cover member 40 of the operable armrest assembly 10 can include a cushion surrounded by a cover membrane that conceals the cushion. In such an embodiment, the cushion and the cover membrane cooperate to provide a cushioning functionality to the arms of the occupant of the vehicle 18. It is contemplated that, in various embodiments, the support plate 28 can be attached directly to the underside of the cover member 40, such that the cover member 40 and the support plate 28 move in unison between the plurality of vertical, lateral and rotational positions 38, 34, 36. It is further contemplated that the support plate 28 of the operable armrest assembly 10 can incorporate an integral finished surface that serves as the cover member 40 of the armrest 130 such that a separate cover member 40 may not be included.

Referring again to FIGS. 4 and 5, the slot 32 defined within the support plate 28 can be a linear slot 32 that extends laterally across the support plate 28. In such an embodiment, the support plate 28 can be slidably operated along the pin 24 disposed on the upper end 26 of the actuator 20 to define the plurality of lateral positions 34 of the operable armrest assembly 10, including the inward and outward positions 62, 64. In order to retain the support panel upon the pin 24 of the actuator 20, the pin 24 can include a top flange 140 that engages a top surface of the support plate 28 such that the support plate 28 is retained between the top flange 140 and the upper end 26 of the linear actuator 20. In embodiments that include the pivot plate 50, the pivot plate 50 can be disposed between the bottom surface 142 of the support plate 28 and the upper end 26 of the linear actuator 20.

Figure 9:
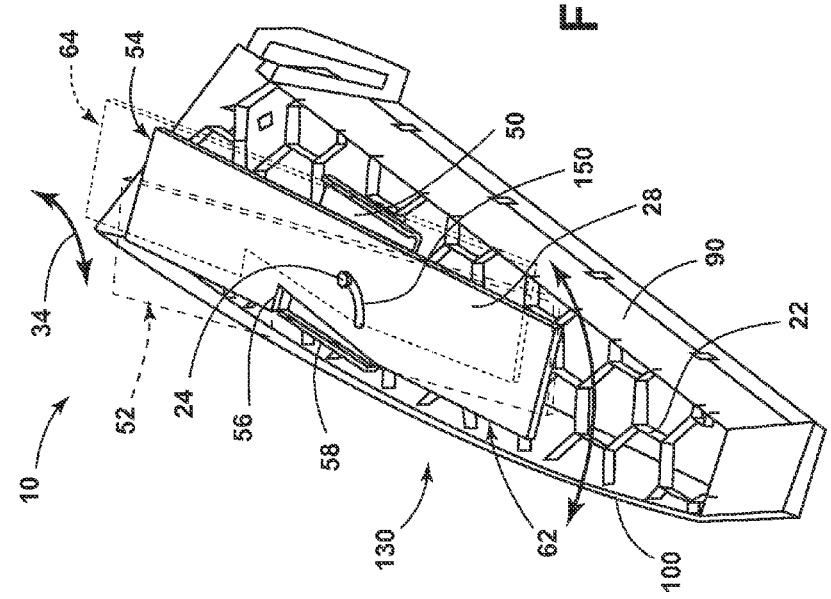
FIG. 9 is a top perspective view of another alternate embodiment of the operable armrest assembly with the cover member in the inward, raised and rotated position.
Figure 12:
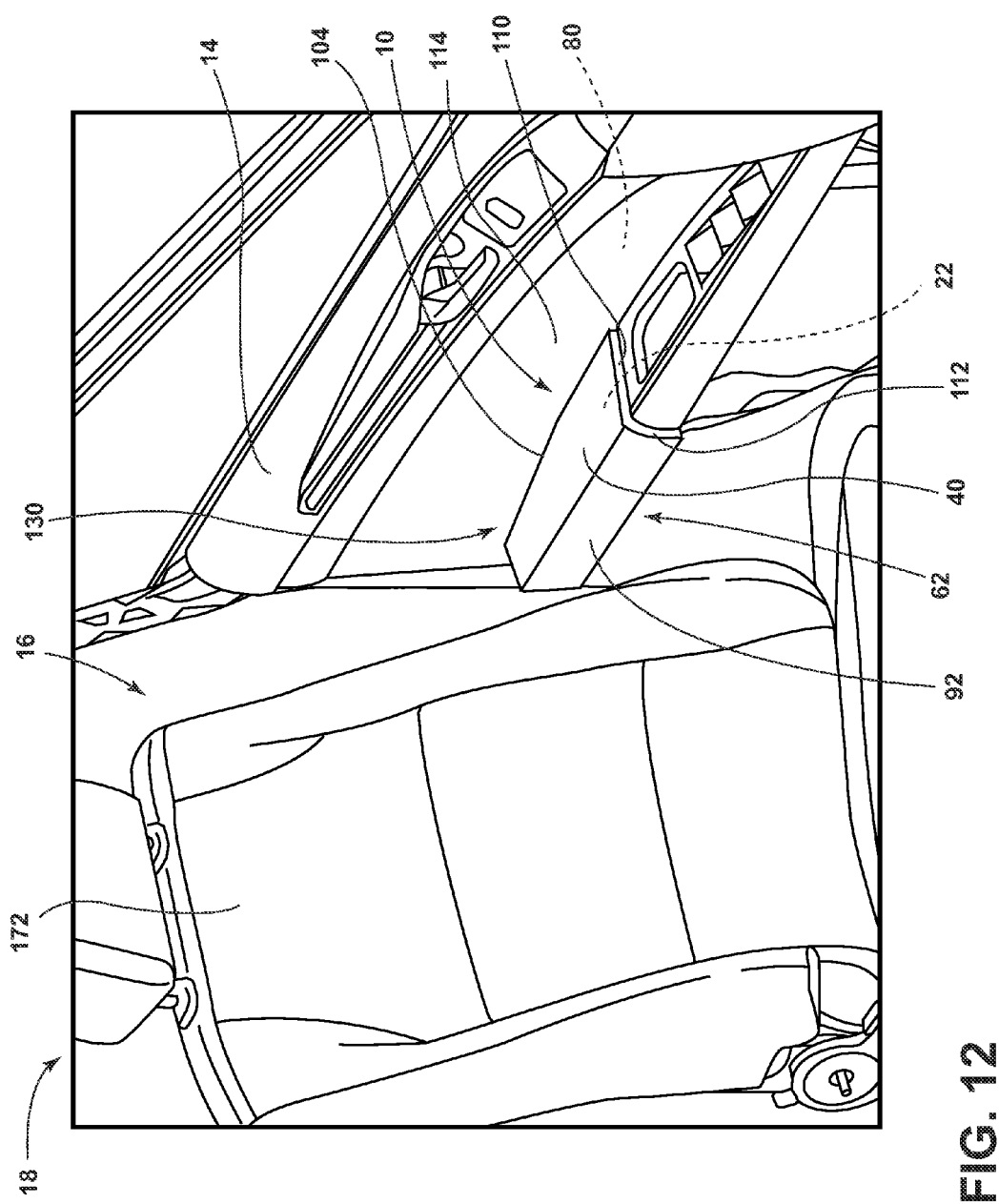
FIG. 12 is a front perspective view of another alternate embodiment of the operable armrest assembly disposed within a vehicle cabin, with the cover member and support plate in a partially extended position.
Figure 13:
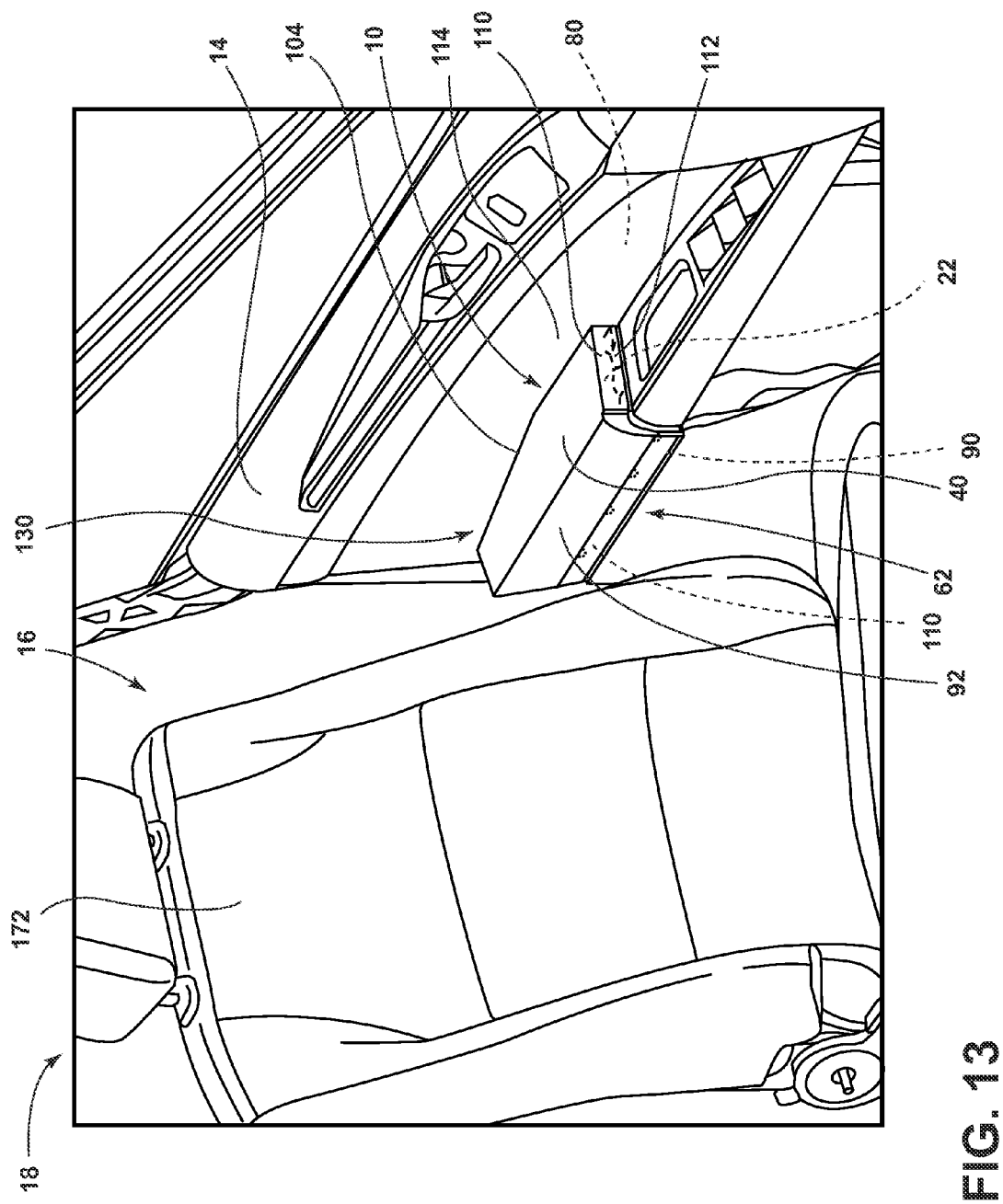
FIG. 13 is a front perspective view of the operable armrest assembly of FIG. 12 with the cover member and support plate in a partially raised position.

In various alternate embodiments, as illustrated in FIG. 9, the slot 32 defined within the support plate 28 can include an arcuate slot 150 that allows the support plate 28 to move in a combined inward and forward direction as the support plate 28 is moved toward the inward position 62. In such an embodiment, the operable armrest assembly 10 will generally be moved inward for occupants who have a less than average height. Accordingly, the seat can generally be moved forward to accommodate such passengers. Where the slot 32 of the support plate 28 is curved in this manner, as the seat is moved forward to accommodate the less than average height individual, the armrest 130 can be simultaneously moved toward the inward position 62 and also forward, thereby following the curvature of the slot 32 defined within the support plate 28. Conversely, when a person having a taller than average height occupies the vehicle seat, the vehicle seat can generally be moved backward, and the armrests 130 moved toward the outward position 64. As the operable armrest assembly 10 is moved toward the outward position 64, the curvature of the slot 32 will allow the armrest 130 to move backward simultaneous with the outward movement of the armrest 130 to accommodate the seat being moved rearward as well. In various alternate embodiments, it is contemplated that the slot 32 defined within the support plate 28 can include different geometries and also have different configurations for the slot 32, such that different movements of the support plate 28 are permissible as the support plate 28 moves between the inward and outward position 62, 64.

Figure 6:
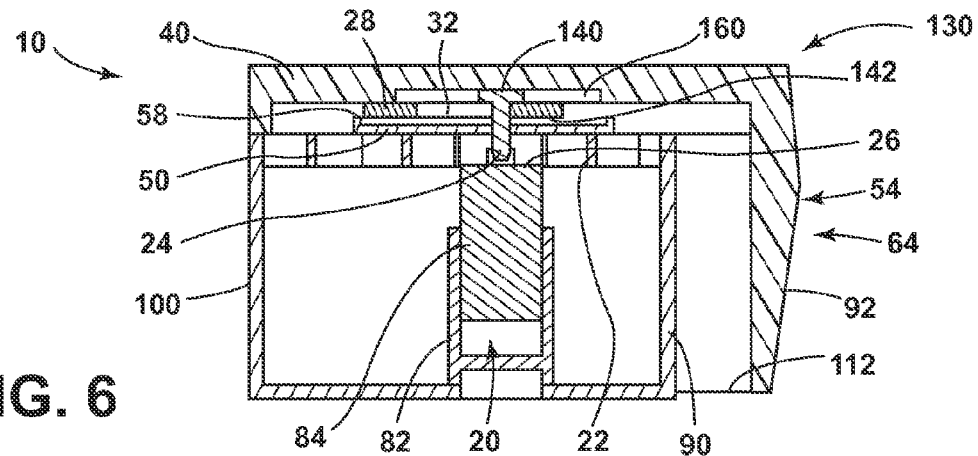
FIG. 6 is a cross-sectional view of the operable armrest assembly of FIG. 2 taken along line VI-VI.

As illustrated in FIGS. 6-8, it is contemplated that the pin 24 of the actuator 20 can extend at least partially through the support plate 28. As the pin 24 is slid through the slot 32 defined within the support plate 28, the top flange 140 of the pin 24 is adapted to slide along the slot 32 and also within a flange recess 160 defined within the cover member 40. The flange recess 160 defined within the cover member 40 is adapted to allow the flange 58 of the pin 24 to move along the slot 32 without the pin 24 engaging, and potentially damaging, the cover member 40. This flange recess 160 can also define the movement of the pin 24 within the slot 32 and also substantially prevent unwanted rotation of the pin 24 within the slot 32 as the support plate 28 is moved between the plurality of positions of the operable armrest assembly 10.

In the various embodiments, it is contemplated that the operable armrest assembly 10 can be disposed within various seating positions within the vehicle 18. Such seating positions can include, but are not limited to, front passenger seat 170, driver's seat 172, any of the rear seats, third row seats, and other seating positions. It is also contemplated that the operable armrest assembly 10 can be disposed within an armrest 130 that is integrated into the seat of vehicle 18, such as one that is attached to the seatback.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle armrest assembly for a door and console, the armrest assembly comprising:
    a linear actuator extending vertically from at least a portion of an armrest substrate and having a pin at an upper end;
    a support plate positioned above the armrest substrate and having a slot, wherein the pin slidably engages the slot to allow the support plate to operate laterally along the slot and rotationally about the pin between a plurality of lateral and rotational positions, respectively, and wherein the linear actuator vertically operates the support plate between a plurality of vertical positions; and
    a cover member disposed over the support plate.

2. The vehicle armrest assembly of claim 1, wherein a pivot plate is disposed proximate the support plate and is adapted to define at least a first rotated position and a second rotated position of the plurality of rotational positions, the first rotated position being different than the second rotated position.

3. The vehicle armrest assembly of claim 2, wherein the support plate includes a cutout portion that is adapted to engage a flange of the pivot plate to define at least the first rotated position.

4. The vehicle armrest assembly of claim 3, wherein the cutout portion is disposed at a predetermined angle relative to the flange of the pivot plate.

5. The vehicle armrest assembly of claim 1, further comprising:
    at least one flexible transition member that extends from the cover member to at least a portion of an internal panel of a vehicle, the internal panel of the vehicle including at least one of the armrest substrate, an inner door panel and a center console.

6. The vehicle armrest assembly of claim 1, wherein the pin includes a top flange, and wherein the support plate is retained between the top flange and the upper end of the linear actuator such that the pin is slidably retained within the slot of the support plate.

7. A vehicle armrest comprising:
    a support plate; and
    a linear actuator having a pin that engages a slot of the support plate, wherein the support plate is operable relative to the pin between a plurality of lateral and rotational positions, and wherein the linear actuator operates the support plate between a plurality of vertical positions.

8. The vehicle armrest of claim 7, wherein a pivot plate is disposed proximate the support plate and is adapted to define at least a first rotated position and a second rotated position of the plurality of rotational positions, the first rotated position being different than the second rotated position.

9. The vehicle armrest of claim 7, wherein the linear actuator extends through at least a portion of an armrest substrate, and wherein the support plate is positioned at least partially above the armrest substrate.

10. The vehicle armrest of claim 7, wherein the slot is a linear slot defined within at least a portion of the support plate.

11. The vehicle armrest of claim 8, wherein the support plate includes a cutout portion that is adapted to engage a flange of the pivot plate to define at least the first rotated position, and wherein the pivot plate is disposed between the support plate and an upper end of the linear actuator.

12. The vehicle armrest of claim 7, further comprising:
at least one flexible transition member that extends from the cover member to at least a portion of an internal panel of a vehicle, the internal panel of the vehicle including at least one of an armrest substrate, an inner door panel and a center console.

13. The vehicle armrest of claim 7, wherein the pin includes a top flange, and wherein the support plate is retained between the top flange and an upper end of the linear actuator such that the pin is slidably retained within the slot of the support plate.

14. A vehicle armrest assembly comprising:
a plurality of support plates, each having an internal slot; and
a vertical actuating assembly adapted to independently operate each of the plurality of support plates between a plurality of vertical positions, wherein each internal slot receives a corresponding pin of the vertical actuating assembly, and wherein each of the plurality of support plates independently operates between a plurality of lateral and rotational positions relative to each corresponding pin.

15. The vehicle armrest assembly of claim 14, wherein the plurality of support plates includes a first door support plate and a first console support plate, and wherein a control mechanism is adapted to simultaneously operate the first door and first console support plates.

16. The vehicle armrest assembly of claim 15, wherein the plurality of support plates further includes second door and second console support plates, wherein the first door and first console support plates are positioned proximate a first seat of a vehicle and the second door and second console support plates are positioned proximate a second seat of the vehicle.

17. The vehicle armrest assembly of claim 16, wherein the first and second console support plates are adjacently positioned within a center console between the first and second seats.

18. The vehicle armrest assembly of claim 14, further comprising:
a pivot plate disposed proximate each of the plurality of support plates, respectively, wherein each pivot plate is adapted to define at least a first rotated position and a second rotated position of the plurality of rotational positions for each of the plurality of support plates, the first rotated position being different than the second rotated position.

19. The vehicle armrest assembly of claim 14, wherein each internal slot is a linear slot defined within at least a portion of each of the plurality of support plates.

20. The vehicle armrest assembly of claim 14, wherein each corresponding pin includes a top flange that is adapted to slidably engage to an internal slot of a corresponding support plate of the plurality of support plates, and wherein the support plate is retained at least partially between the top flange and an upper end of actuators of the vertical actuating assembly.

* * * * *